Dec. 8, 1953  R. M. BRINK  2,661,623
TENSIOMETER
Filed June 18, 1949  2 Sheets-Sheet 1
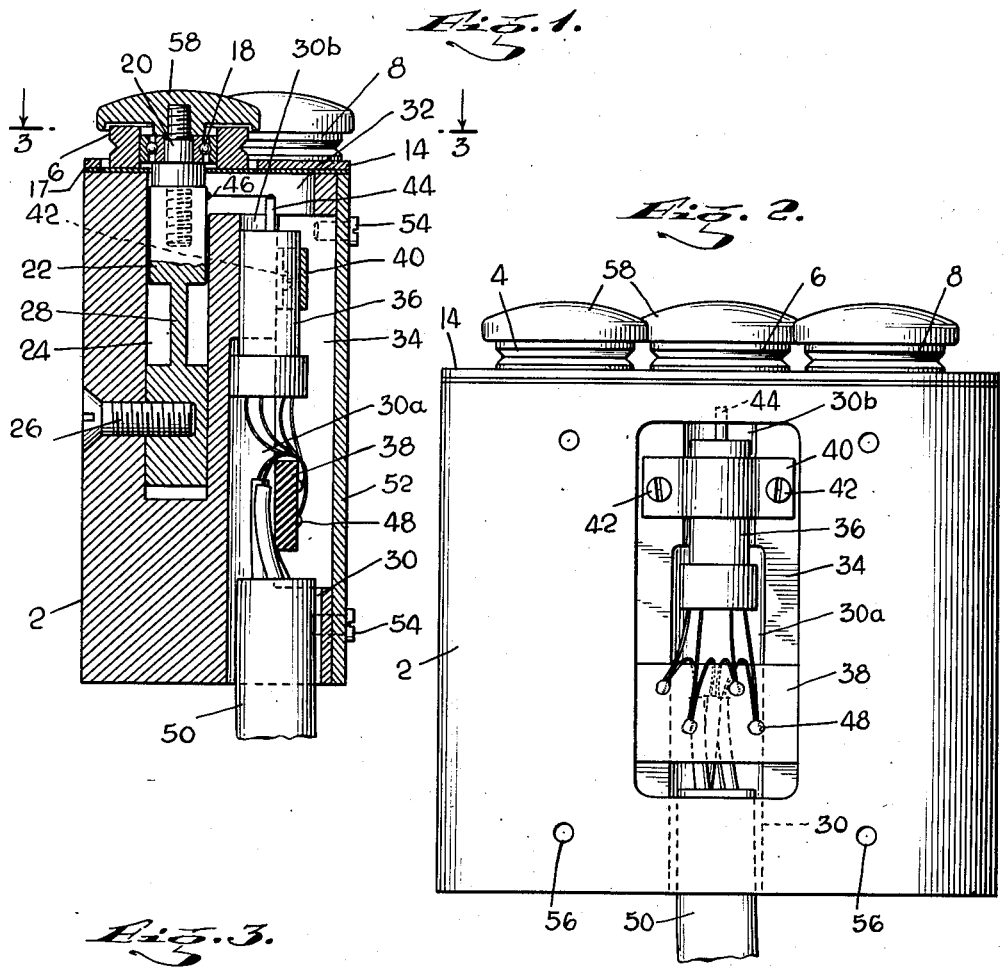
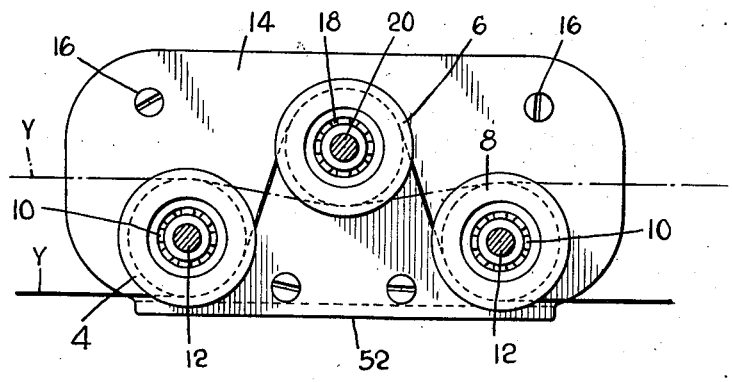
INVENTOR.
ROBERT M. BRINK
BY Louise E. Norton
ATTORNEY Dec. 8, 1953  R. M. BRINK  2,661,623
TENSIOMETER
Filed June 18, 1949  2 Sheets-Sheet 2
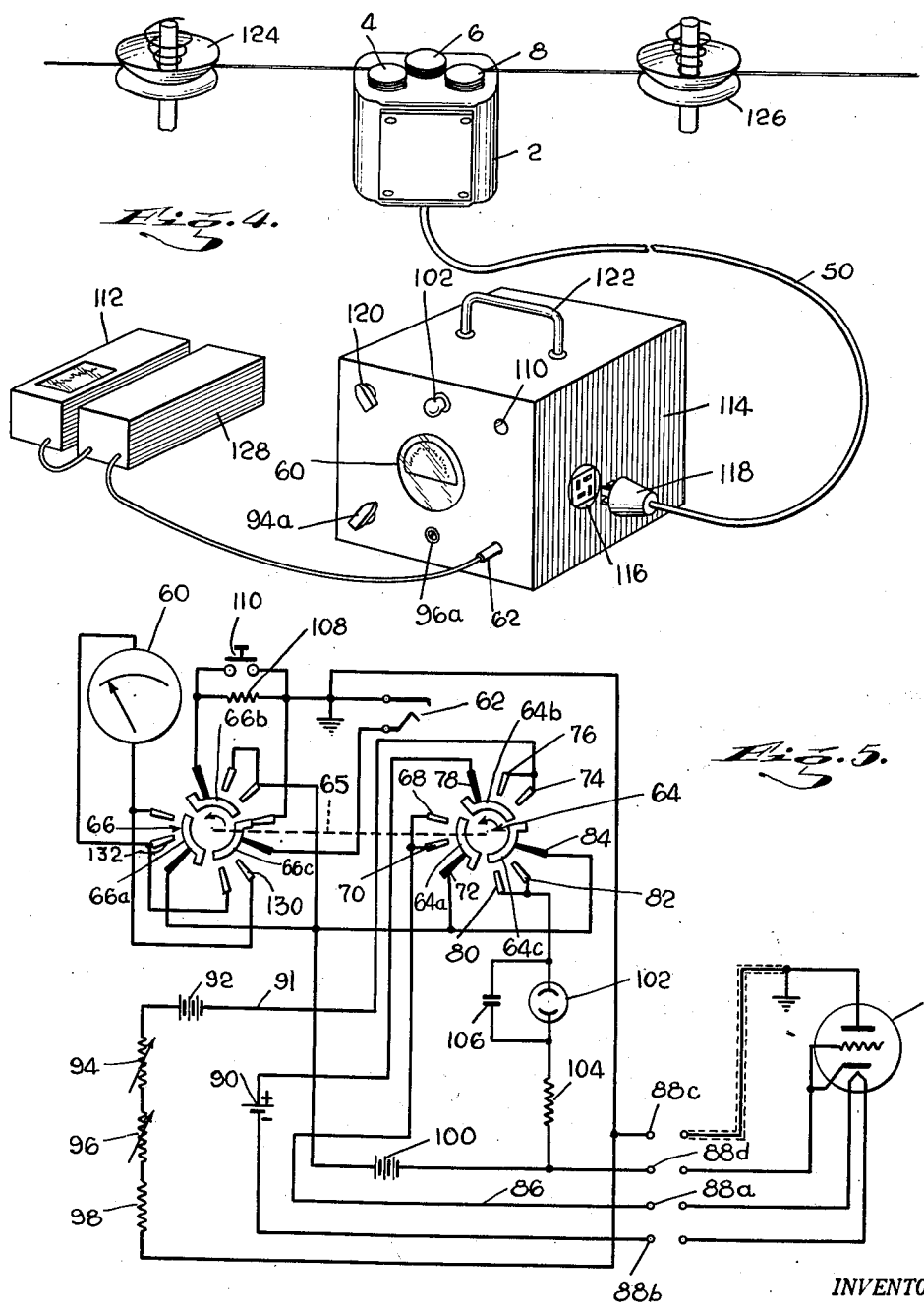
INVENTOR.
ROBERT M. BRINK
BY
Louisa E. Norton
ATTORNEY Patented Dec. 8, 1953

2,661,623

UNITED STATES PATENT OFFICE 2,661,623

TENSIOMETER

Robert M. Brink, Greenwich, Conn., assignor to Deering Milliken Research Trust, Greenwich, Conn., a nonprofit trust of Maine Application June 18, 1949, Serial No. 99,961

10 Claims. (Cl. 73—144)

The present invention relates to measuring instruments, and more specifically to instruments for measuring tension in filamentary material, and comprises a sensitive instrument of this type which, although particularly adapted for use in the textile industry for measuring tension in a travelling end of yarn, can be advantageously employed for measuring tension in any type of filamentary material, whether or not strictly classifiable as yarn.

Particularly in the textile industry has there been a need for a sensitive tensiometer that can detect and measure small tension variations in filamentary material, that does not introduce appreciable tension into material when measuring the tension therein and that can be used to measure tension in filamentary material during rapid travel thereof. The tensiometer of the present invention meets these desiderata. It is sensitive and rapid, yet stable over a relatively wide range; it can be inserted in the path of an end of yarn being processed on a machine, such as a twister, winder, quiller, doubler or warper, without interfering with the operation of the machine and without appreciably enhancing the normal tension in the yarn. The device of the invention requires but few and relatively simple parts. In the preferred embodiment of the invention, the parts are assembled in compact portable form requiring no connection to any external source of power.

In order to produce a reasonably large mechanical indication of tension, it has heretofore been considered necessary for a tensiometer to include an element having a relatively high compliance. This means that when, as is usual, a pulley rotated by the travelling yarn is used for transmitting deflections to the element, a very light and consequently very small pulley must be used if rapid changes in tension are to be detected. Excessive rotational speeds of such small pulleys result when the meter is used for measuring tension in yarn travelling at high speed. The natural frequency of a system of high compliance is relatively low and hence when such type system is incorporated in a tension responsive device rapid changes in tension are not accurately recorded. In the meter of the present invention, excessive speeds of rotation of the pulley or pulleys rotated by the yarn is avoided by the employment of a beam of low compliance and by the provision of means for translating minute deflections of such beam into relatively large changes in the conditions of an electrical circuit, the beam of low compliance permitting the use of relatively large diameter pulleys in the yarn path with corresponding reduction in rotational speed as compared to the small light pulleys of tension meters heretofore in use. The moving element of the new device, having low compliance, has a high natural frequency of oscillation, and hence rapid changes in tension can be effectively detected.

For an understanding of the invention and of a preferred embodiment thereof, reference may be had to the accompanying drawings of which:

Fig. 1 is a vertical sectional view of the tension head of a tensiometer embodying the invention, Fig. 2 is a front elevation of the head of Fig. 1, a cover plate being removed to disclose the parts ordinarily concealed thereby, Fig. 3 is a horizontal sectional view taken on the line 3—3 of Fig. 1, Fig. 4 is a perspective view showing the tensiometer of the invention in use and arranged for actuation of a recording device, and Fig. 5 is a circuit diagram of the tensiometer of Fig. 4.

The tension head of the new tensiometer, shown best in Figs. 1 to 3, comprises a block 2, of metal or the like, on one end of which are yarn engaging pulleys 4, 6 and 8. Pulleys 4 and 8 are mounted by means of ball bearings 10 on stub shafts 12. The shafts 12 are fixedly mounted in the block 2. A plate 14, suitably apertured for accommodation of the shafts 12, is secured by screws 16 to the block and a diaphragm 17, also suitably apertured, is held between the plate and block. Pulley 6 is mounted by means of ball bearings 18 on a shaft 20 which passes through an aperture in the plate 14 and diaphragm 17 and is threaded into the upper end of a beam 22. Beam 22 is mounted within a cavity 24 in the block 2, the lower end of the beam 22 being press fit into the cavity and fixed to the block 2 by means of a screw 26. The beam 22 is cut away intermediate its ends as shown in Fig. 1, to provide an intermediate section 28 of reduced thickness. The upper portion of the beam is of slightly less thickness than the width of the cavity to provide sufficient clearance for limited flexing of the beam and, therefore, limited movement of the pulley 6 carried thereby. The block 2 has a vertical cylindrical passage or channel 30 therethrough comprising upper and lower sections 30a and 30b of different diameter and of different length, the upper section 30b being of lesser length and of lesser diameter. Formed in the upper end of the block 2, and connecting section 30b of channel 30 and cavity 24, is a passage 32. The block 2 is also cut away along the major part of the channel 30 to provide a chamber 34 within which are mounted a transducing tube 36 of the movable anode type, as for example, an RCA 5734, and a terminal plate 38 of insulating material. The tube 36 is set into the section 30b of channel 30 and is held therein by a clip or bracket 40 fastened by screws 42 to the inner wall of the chamber 34.

The anode connection 44 of tube 36 extends up into passage 32 and at its end is welded or soldered to one end of a relatively stiff wire 46 which extends through the passage 32 and is welded at its other end to the beam 22. The insulating plate 38 carries four terminal posts 48 for connection of the lead wires from the electrodes of tube 36 to output leads of a cable 50, the end of cable 50 being introduced into channel 30 through the lower open end thereof. A cover plate 52 for the chamber 34 is secured to the block 2 by screws 54 threading into holes 56.

The pulleys 4, 6 and 8 are preferably of the same diameter and the axis of pulley 6 is offset from the vertical plane containing the axes of pulleys 4 and 8 through a distance less than the diameter of a pulley. Consequently when yarn Y is threaded around the pulleys, its path is deflected and a component of force is provided varying with the tension in the yarn and acting on pulley 6 in a direction normal to the plane containing the axes of pulleys 4 and 8. The direction of deflection of the pulley 6 with increase in tension in the yarn depends upon the manner in which the yarn is threaded about the pulleys. For measurements of relatively low tension, the yarn Y is threaded as shown in solid lines in Fig. 3, that is with the yarn in engagement with pulley 6 through a relatively large angle on the side remote from pulleys 4 and 8. When the yarn is so threaded, increase in tension in the yarn tends to move the pulley 6 toward the plane containing the axes of pulleys 4 and 8. For measurements of relatively high tension, the yarn path is as shown in dotted lines in Fig. 3, that is, with the yarn Y in engagement with pulley 6 through a relatively small angle on the side nearer the pulleys 4 and 8. Preferably, in order to prevent catching of the yarn on moving parts and to insure that the yarn when slack, does not slip off from a pulley, a fixed cover or cap 58 having an overhanging lip is secured to each pulley shaft. The diaphragm 17 serves to prevent entrance of lint or dust into the cavity 24.

With the above described construction of tension head, changes in tension in the yarn, acting through pulley 6, cause corresponding flexures of the beam 22, which in turn through wire 46 moves the anode of tube 36 relatively to the control grid and hence correspondingly varies the conductance of the tube.

Variations in conductance of the tube 36 in response to yarn tension variations are detected by a circuit such as that shown diagrammatically in Fig. 5, the tube being connected to the circuit by means of the cable 50. The circuit is essentially a bridge circuit. It includes a meter 60 the scale of which may be conveniently calibrated in terms of yarn tension, for use in initially balancing the circuit and for giving average or integrated readings of yarn tension. The circuit includes also output terminals 62 adapted for connection to suitable amplifying and recording devices so that permanent records of tension variations may be made.

Two three position rotary switches 64 and 66, ganged together for conjoint operation, as indicated diagrammatically by the dashed line 65, control the connections from batteries 90, 92 and 100 to the electrodes of tube 36 and to the meter 60. In the drawing the "off" position of the switches is illustrated. The rotary portion of switch 64 comprises three conducting arcuate segments 64a, 64b and 64c, each of which has a radial extension thereon. Disposed adjacent the first or "off" position of segment 64a are relatively short fixed contacts 68 and 70 and a longer fixed contact 72. Contacts 68 and 70 are connected together and so spaced that the radial extension of segment 64b when the switch is rotated counterclockwise to the first "on" position engages contact 68 and when the switch is turned to the second "on" position engages contact 70, whereas contact 72 engages segment 64a in each position of the switch. Similarly short fixed contacts 74 and 76, disposed adjacent the "off" position of segment 64b are connected together and spaced for successive engagement with the radial extension of segment 64c as the switch is rotated counterclockwise from the "off" through the first "on" position to the second "on" position, and a relatively long fixed contact 78 is positioned for engagement with segment 64b independently of the switch position. Likewise, the radial extension on segment 64a successively engages short fixed contacts 80 and 82 when the switch is rotated through the first "on" position to the second "on" position, segment 64c being engaged in each position by a relatively long fixed contact 84.

Contacts 68 and 70 are connected by a lead 86 to a terminal 88a adapted to be connected through cable 50 to one lead of the cathode heater of tube 36. Contact 78 is connected to one terminal of the heater supply battery 90, the other terminal of which is connected to a terminal 88b adapted to be connected through cable 50 to the other heater lead. Thus, in each "on" position of switch 64 the cathode heater circuit is closed through segment 64b of switch 64.

Contacts 74 and 76 are connected through a lead 91 to the negative terminal of battery 92 the positive terminal of which is connected through variable resistors 94 and 96 and fixed resistor 98 to a terminal 88c adapted for connection through cable 50 to the anode of tube 36. Contact 84 is connected to the positive terminal of battery 100 the negative terminal of which is connected to a terminal 88d adapted for connection through cable 50, to the cathode and control grid of tube 36. Thus in both "on" positions of switch 64 batteries 100 and 92 and resistors 94, 96 and 98 are serially connected across the tube 36, the circuit being completed through contact 84, segment 64c and either contact 74 or 76.

Contacts 80 and 82 are connected through a neon signal light 102 and a resistor 104 to the negative terminal of battery 100 and contact 72 is connected to the positive terminal of that battery. Hence in each "on" position of the switch, the energizing circuit of lamp 102 is closed through segment 64a. A quenching condenser 106 connected across lamp 102 together with the resistor 104 cause blinking of the lamp when the circuit is closed.

Switch 66 controls the connections to the meter 60, opening the connections thereto in the "off"

position and reversing the connections thereto when moved from one "on" position to the other. The switch, like switch 64 comprises three arcuate conducting segments, 66a, 66b and 66c each having a radial extension for engagement with a short fixed contact in each "on" position of the switch. As with switch 64, a long fixed contact engages an associated segment in all three positions of the switch 66. In each "on" position of switch 66 the meter 60 is connected in series with a resistor 108 across the tube 36 and battery 100 and hence, when the conductance of the tube is such that the potential difference across that tube and across the battery 100 is equal to that across the three resistors 94, 96 and 98 and the battery 92, no current will flow through the meter. Switch 66 also controls the connections to the terminals 62, one terminal being connected to the anode of tube 36 and the other, through switch 66 in each "on" position, to the positive terminal of battery 100.

A normally open manually operated push button switch 110 is provided for shorting the resistor 108 in the meter circuit. The circuit is grounded both at the anode of tube 36 and at the terminal 62 connected thereto through terminal 88c and cable 50.

Prior to measurement or recording of tension variations, resistors 96 and 94 are adjusted to bring the meter reading to zero when no yarn is threaded around the pulleys of the tension head. In making this adjustment resistor 96, which is substantially larger than resistor 94, is first varied until the meter reading is zero while the shorting switch 110 is open. Resistor 94 is then varied until, with switch 110 closed to shunt resistor 108, there is still a null indication of the meter. The device, after the above adjustment has been made, is ready for use either to give a continuous record of tension variations when a recording device such as indicated at 112 in Fig. 4, is connected through a suitable amplifier to the circuit at terminals 62 or for direct reading at intervals of the meter 60 during travel of yarn on the pulleys of the tension head. It will be understood that when yarn is threaded about the pulleys 4, 6 and 8 the switches 64 and 66 are turned to that one of the "on" positions which causes the needle of the meter to be deflected toward positive dial readings. The scale of meter 60 can read directly in terms of yarn tension, initial calibration of the scale being readily effected by noting needle deflections when known weights are suspended from an end of yarn threaded about the pulleys of the head while the head is held with the pulley axes horizontal. When the tension in travelling yarn is being measured, if the tension changes are rapid, meter 60 being necessarily inherently damped by the inertia of its parts, will give average or integrated tension reading.

All of the circuit elements of the device can be conveniently assembled within a small portable housing such as indicated at 114 in Fig. 4. The terminals 88a, 88b, 88c and 88d of the circuit are connected within the casing to terminals of a socket 116 insulatedly mounted in one side wall of the casing for reception of a plug 118 carried on the end of cable 50. Another side wall of the casing has mounted therein the meter 60, the signal light 102, jack terminal 62 for connection to the recording device 112, the manually operable member 120 of the switches 64 and 66, the push button switch 110 and adjusting means 96a and 94a for resistors 96 and 94 respectively. Preferably, a handle 122 is secured to the upper wall of the housing 114.

In Fig. 4 the tension head is shown as inserted in the path of yarn travelling between tension devices 124 and 126 for transmission of detected tension variations to the recording device 112 after amplification in a suitable amplifier 128. Integrated tension readings can be taken from the dial of the meter 60 when switch 110 is closed.

The invention has now been described with particular reference to one specific embodiment thereof. Obviously various changes could be made in the particular construction illustrated and certain parts could be omitted if desired without departing from the spirit of the invention or the scope of the appended claims. For example, the rotary switches 64 and 66 have been shown and described as three-position switches as with such arrangement the meter connections can be reversed to cause the direction of deflection of the meter needle with increase in tension to be the same irrespective of the manner in which the yarn is threaded about the pulleys of the head. Obviously, a center zero reading meter could be used with corresponding sacrifice in scale reading, if desired, in which case a simple two position switch could be employed instead of the two three-way switches of the circuit of Fig. 5, or the meter could be omitted and balance obtained by reference to the indicator of the recording device, or but one yarn path could be provided. Similarly the signal light 102, which when flashing indicates that the circuit is energized, is useful but not essential to the operation of the device. The power supply for the indicating and measuring circuit is preferably of the dry cell type as there is less voltage fluctuation with such type and also as dry cell batteries may be readily accommodated within the portable housing. If desired, however, an external source of energy could be connected to the circuit, and the batteries eliminated. Various other modifications will occur to those skilled in the art.

The following is claimed:

1. A tensiometer for filamentary material comprising in combination a cantilever beam of low compliance, filamentary material engaging means carried by the free end of said beam for transmitting to said beam forces tending to flex the beam in accordance with the tension in filamentary material in engagement with said means, a transducing tube having a movable anode, a relatively stiff connection between said anode and the movable part of said beam and an indicating device connected to said tube and responsive to changes in conductance thereof, said beam having a cross section reduced in one dimension intermediate the fixed and movable parts, said reduced cross section determining the plane of flexure of said beam.

2. The tensiometer according to claim 1 wherein said filamentary material engaging means comprises a pulley mounted on the free end of said beam for rotation by travelling filamentary material, and including spaced guide means for the material positioned to insure a substantial angle of contact of the material with said pulley.

3. In a tensiometer for a travelling end of yarn, a tension head comprising a block having an elongated cavity therein, a beam mounted within said cavity for limited movement of one end thereof, a pair of spaced pulleys mounted on axles fixed to said block on opposite sides of said cavity, a pulley mounted on an axle fixed in the movable end of said beam, the axle of said last mentioned pulley being offset from the plane containing the axes of said first mentioned pulleys, whereby when the head is positioned for engagement of a travelling end of yarn with all three pulleys, the tension in the yarn acting through the pulley carried by said beam tends to flex the beam, a movable anode transducing tube carried by said block and means connecting the anode of said tube with the movable end of said beam for movement therewith.

4. The tension head according to claim 3 wherein said block is provided with a chamber and with a passage interconnecting said chamber and cavity, said tube being mounted in said chamber and the connection between the anode of the tube and the beam being disposed within said passage, a terminal plate mounted in said chamber and an opening to said chamber for reception of a cable for connection at said terminal plate to the electrode leads of said tube.

5. A tensiometer for filamentary material comprising in combination a transducing tube having a movable anode, means responsive to tension in filamentary material for moving said anode, a circuit including a source of energy and an adjustable resistor, an indicating device and switch means for connecting said tube in said circuit in series with said resistor across said source and for connecting said indicator across a part of said source and said resistor, whereby said resistor may be adjusted for zero potential across the indicating device in the absence of filamentary material under tension acting upon said tension responsive means.

6. The tensiometer according to claim 5 including means for connecting amplifying and recording means to said circuit in parallel with said indicating device.

7. The tensiometer according to claim 5 including a resistor in series with said indicating device and manually operable means for shorting said resistor.

8. A tensiometer for filamentary material comprising in combination a transducing tube having a movable anode, a beam of low compliance adapted to be flexed in response to tension in filamentary material, said beam being connected to the anode of said tube for movement thereof upon flexing of the beam, a circuit including a source of energy and at least one adjustable resistor, an indicating device and a multiple switch having one "off" position in which said circuit is open and two "on" positions in each of which said tube is connected in said circuit in series with said resistor across said source and said device is connected across a part of said source and said resistor, the connections to said device in one "on" position being reversed with respect to the connections in the other "on" position.

9. The tensiometer according to claim 8 including a signal lamp and means controlled by said multiple switch for energizing said light from said source at each "on" position of said switch.

10. A tensiometer for filamentary material comprising in combination a transducing tube having a movable anode, means responsive to tension in filamentary material for moving said anode, said tension responsive means including guide means and a beam of low compliance positioned with respect to said guide means to provide two different threading arrangements for said filamentary material, said beam being adapted to be flexed in a given direction in response to tension in filamentary material when said material is threaded in accordance with one of said arrangements and is flexed in the opposite direction when said material is threaded in accordance with the other of said arrangements, means for mechanically connecting said beam to the anode of said tube, an energizing circuit for said tube, a tension indicating device connected to said circuit, and switch means connected to said energizing circuit for reversing the connections to said tension indicating device to facilitate indications of tension for each of said threading arrangements.

ROBERT M. BRINK.

References Cited in the file of this patent

UNITED STATES PATENTS

| Number | Name | Date |
|---|---|---|
| 1,306,891 | Grafton | June 17, 1919 |
| 2,100,653 | Umansky | Nov. 30, 1937 |
| 2,231,570 | Ryder | Feb. 11, 1941 |
| 2,284,364 | Breazeale | May 26, 1942 |
| 2,287,794 | Gunn | June 30, 1942 |
| 2,343,229 | Stone et al. | Feb. 29, 1944 |